United States Patent
Jung et al.

(10) Patent No.: US 8,929,955 B2
(45) Date of Patent: Jan. 6, 2015

(54) TOUCH INFORMATION COMMUNICATION TERMINAL, TOUCH SCREEN INFORMATION PROVIDING APPARATUS AND TOUCH INFORMATION COMMUNICATION METHOD THEREOF

(75) Inventors: Soon-Chul Jung, Seoul (KR); Mun-Suk Kang, Seoul (KR); Jae-Dong Lee, Seoul (KR); Yu-Jin Huh, Seoul (KR); Mi-Kyoung Kang, Seoul (KR); Sang-Hong Lee, Seoul (KR); Jin-Soo Sohn, Yongin-si (KR); Dae-Woo Choi, Seoul (KR)

(73) Assignee: KT Corporation, Gyeonggi-do (KR)

( * ) Notice: Subject to any disclaimer, the term of this patent is extended or adjusted under 35 U.S.C. 154(b) by 847 days.

(21) Appl. No.: 13/131,850

(22) PCT Filed: Dec. 15, 2009

(86) PCT No.: PCT/KR2009/007511
§ 371 (c)(1),
(2), (4) Date: May 27, 2011

(87) PCT Pub. No.: WO2010/071349
PCT Pub. Date: Jun. 24, 2010

(65) Prior Publication Data
US 2011/0237308 A1      Sep. 29, 2011

(30) Foreign Application Priority Data

Dec. 16, 2008   (KR) .................. 10-2008-0128051
Dec. 14, 2009   (KR) .................. 10-2009-0123773

(51) Int. Cl.
*H04B 1/38*     (2006.01)
*H04L 29/08*    (2006.01)
*H04L 29/06*    (2006.01)
*H04W 4/20*     (2009.01)

(52) U.S. Cl.
CPC ............ *H04L 67/34* (2013.01); *H04L 65/1006* (2013.01); *H04L 67/36* (2013.01); *H04L 67/04* (2013.01); *H04W 4/20* (2013.01)
USPC .......................................... 455/566; 455/559

(58) Field of Classification Search
USPC ............................... 455/414.1, 415, 559, 566
See application file for complete search history.

(56) References Cited

U.S. PATENT DOCUMENTS 7,774,505 B2    8/2010  Kang et al.
2009/0175264 A1*  7/2009  Reitalu et al. ................. 370/352

FOREIGN PATENT DOCUMENTS

CN        101159794 A       4/2008
KR    10-2006-0099385 A     9/2006

OTHER PUBLICATIONS

International Search Report dated Dec. 15, 2009 of PCT/KR2009/007511 (4 pages).

(Continued)

*Primary Examiner* — Sam Bhattacharya
(74) *Attorney, Agent, or Firm* — IP Legal Services, LLC

(57) ABSTRACT

A touch information communication method transmits notification information to the touch screen information providing apparatus by carrying the notification information, which notifies a touch communication terminal is a touch communication terminal, on a call signal in a telephone communication network; receives touch screen information and touch control information corresponding to the touch screen information from the touch screen information providing apparatus; and when a user touches a predetermined area on a screen, determines the touched area and transmits touch input information corresponding to the touched area to the touch screen information providing apparatus.

22 Claims, 9 Drawing Sheets

(56) References Cited

OTHER PUBLICATIONS

Written Opinion dated Dec. 15, 2009 of PCT/KR2009/007511 (3 pages).

Rosenberg, et al., "Indicating User Agent Capabilities in the Session Initiation Protocol (SIP).", Network Working Group, Request for Comments (RFC): 3840, Category: Standards Track, Aug. 2004.

* cited by examiner

TOUCH INFORMATION COMMUNICATION TERMINAL, TOUCH SCREEN INFORMATION PROVIDING APPARATUS AND TOUCH INFORMATION COMMUNICATION METHOD THEREOF

TECHNICAL FIELD

The present invention relates to a touch information communication method in a telephone communication network.

BACKGROUND ART

Generally, a keypad of a phone is a unique interface apparatus that receives and transmits information from and to the other party during a call. A user presses buttons on the keypad to transmit a DTMF signal to the other party. The DTMF signal represents a total of 16 unit information, for example, digits 0 to 9, hook signals such as *, #, etc. Many operations, such as making a phone call to the other party, inputting a credit card number during a call, inputting a password, selecting menus using an automatic response system (ARS), etc are performed by combining the unit information.

All telephone terminals, including a general wire telephone terminal, an Internet phone terminal, and a mobile phone, include the keypad that transmits the DTMF signal or an apparatus similar to the keypad.

Meanwhile, the latest Internet phone terminal or the mobile phone includes a touch screen as a user interface apparatus therein from its own necessity.

Recently, a packet-based broadband converged network and a 3G mobile communication network are rapidly replacing the existing public switched telephone network (PSTN). An audio call and a video call can be made in the networks but the video call can be commonly used in near future.

The video call can perform the complicated works easier and more intuitively than the audio call by adding the vide channel to the audio channel and can perform the impossible works in the audio channel.

However, there is a limitation in performing the video call by the transmission and reception of the DTMF using the keypad when performing the complicated interaction with the other party.

Therefore, there is a need to transmit and receive the DTMF signal and the touch screen-related information during a call.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a touch information communication terminal capable of allowing a communication terminal including a touch related input unit in a telephone communication network to transmit and receive touch information during video call, a touch screen information providing apparatus, and a touch information communication method thereof.

Technical Solution

In order to achieve the technical object, a touch information communication method according to an exemplary embodiment of the present invention includes: transmitting notification information to the touch screen information providing apparatus by carrying the notification information, which notifies a touch communication terminal is a touch communication terminal, on a call signal; receiving touch screen information and touch control information corresponding to the touch screen information from the touch screen information providing apparatus; and when a user touches a predetermined area on a screen, determining the touched area and transmitting touch input information corresponding to the touched area to the touch screen information providing apparatus.

A touch information communication method according to another embodiment of the present invention includes: receiving a call signal that includes notification information notifying a touch communication terminal from the external terminal; transmitting first touch screen information and first touch control information corresponding to the first touch screen information to the external terminal when a call signal including the notification information is received; and receiving touch input information that corresponds to a touched area from the external terminal.

A touch information communication terminal according to another embodiment of the present invention includes: a display unit that displays touch screen information; a touch input unit that is attached to the display unit and receives the user's selection by the touch; a communication unit that performs a communication function with the touch screen information providing apparatus; and a controller that controls to transmit a call signal including notification information notifying a touch communication terminal to the touch screen information providing apparatus through the communication unit, to receive touch screen information and touch control information corresponding to the touch screen information from the touch screen information providing apparatus, and to transmit touch input information corresponding to an area touched by the touch input unit to the touch screen information providing apparatus.

A touch screen information providing apparatus according to another embodiment the present invention includes: a communication unit that performs a communication function with the external terminal; a database that stores touch screen information to be displayed on a screen and touch control information corresponding to the touch screen information; and a controller that controls to transmit first touch screen information and first touch control information corresponding to the first touch screen information that are stored in the database, when a call signal including notification information, notifying the touch communication terminal is received from the external terminal. A touch information communication method according to another embodiment of the present invention includes: transmitting notification information to the touch screen information providing apparatus by carrying the notification information notifying a touch communication terminal on a call signal and performing signal conversion on the notification information by a video gateway that performs inter-heterogeneous network signal conversion; receiving a call signal from the touch screen information providing apparatus by performing the signal conversion on touch screen information and touch control information corresponding to the touch screen information by the image repeater; and determining a touched area when a user touches a predetermined area on a screen, performing the signal conversion on touch input information corresponding to the touched area by the video gateway, and transmitting the touch input information to the touch screen information providing apparatus.

MODE FOR INVENTION

Figure 1:
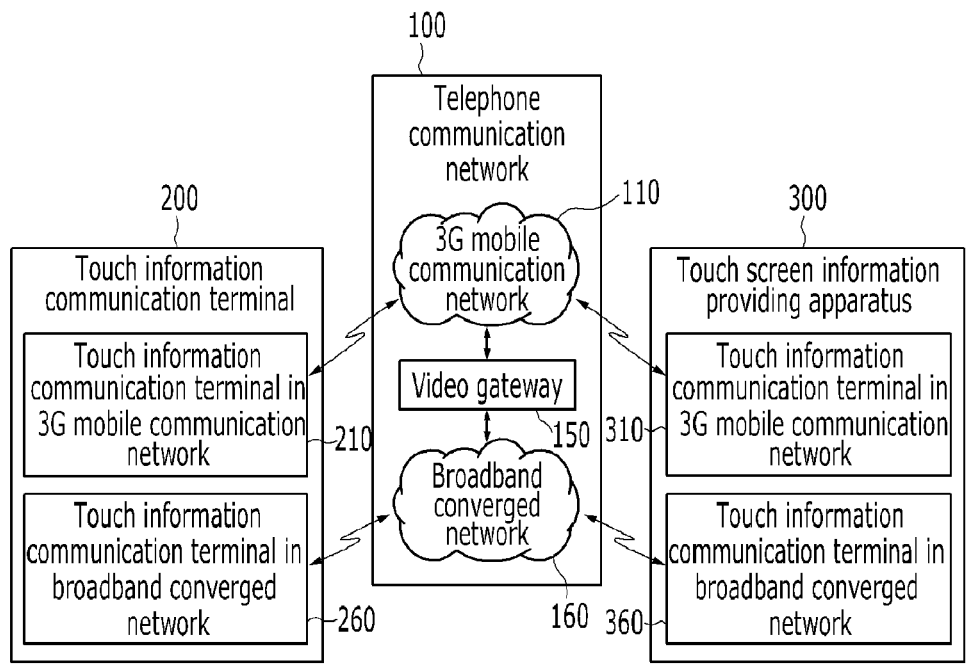
FIG. 1 is a diagram showing a connection relation between a touch information communication terminal and a touch screen information providing apparatus according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

Items to be used in an exemplary embodiment of the present invention will be defined as follows.

An SIP (Session Initiation Protocol, SIP) is a signal protocol that is used to perform a call in a broadband converged network (BcN), an SS7 (Signal System 7) is a signal protocol that is used to make a phone call in a 3G mobile communication network in addition to the existing public switched telephone network, and H.245 is a signal protocol that is used to exchange information necessary to communicate terminal performance and multimedia communication between terminals in the 3G mobile communication network. A call setup process is a process that turns a dial to make a phone call in a general telephone terminal including a touch information communication terminal and a touch screen information providing apparatus or answers the telephone to transmit and receive a call signal. The call setup process is completed by allowing a user to make a phone call and a receiver to answer the telephone in terms of the user. When the call setup is succeeded, a line is busy.

During the call setup process, a serial of signals such as SIP Invite (origination), 180 Ringing (generating transmission sound), 200 OK (receiver response), and ACK (call setup completion) are transmitted and received in a broadband communication network. A serial of signals such as IAM (Initial Address Message: origination), ACM (Address Complete Message: generating transmission sound), ANM (Answer Message: receiver response) are transmitted and received in the 3G mobile communication network. Touch input information is an output value generated when the user touches any portion of a touch screen and may be a coordinate value of a touched position or a DTMF value. Touch control information is information that stores a touch screen area on which touch screen information is displayed and an output value such as a DTMF that corresponds to the touch screen area.

Conditions of messages and transmission methods, etc., when a touch information communication terminal, which receives the touch control information, transmits the touch control information to the touch screen information providing apparatus will be described in the touch control information.

FIG. 1 is a diagram showing a connection relation between a touch information communication terminal and a touch screen information providing apparatus according to an exemplary embodiment of the present invention.

A telephone communication network 100, which supports a video call, can be generally classified into a 3G mobile communication network 110 and a broadband converged network 160. The telephone communication network 100 plays a role of transmitting a touch information related signal between a touch information communication terminal 200 and a touch screen information providing apparatus 300 during a call setup process or a call. The telephone communication network 100 includes a group of various communication apparatuses (not shown) and includes a program that transmits a telephone call management and various touch information related signals to the touch information communication terminal 200 and the touch screen information providing apparatus 300. The group of communication apparatuses in the 3G mobile communication network 110 may include a base station controller, a mobile switching center, etc., and the group of communication apparatuses in the broadband converged network 160 may include an IMS switch (IP Multimedia System), a service broker controller (SBC), an application server (AS), etc.

A video gateway (VGW) 150 performs signal and medium conversion on the video call between the 3G mobile communication network 110 and the broadband converged network 160. In other words, the signal conversion between an SIP, which is a signal protocol of the broadband converged network 160 and an SS7 and H.245, which is a signal protocol of the 3G mobile communication network 110 and the signal conversion between an RTP (Realtime Transport Protocol), which is a medium protocol of the broadband converged network 160, and H.324M, which is a medium protocol of the 3G mobile communication network 110, are performed.

The touch communication terminal 200, which transmits the touch input information, receives the touch screen information and the touch control information to display the touch screen information to the user and includes apparatuses such as the touch screen or a touch pad, etc., to process the touch input information by the touch control information when the user touches the touch screen and to transmit the processed touch input information to the touch screen information providing apparatus 300. The touch information communication terminal 200 includes a function of making a phone call or answering the phone, a function of transmitting a message notifying that the touch information communication terminal 200 includes the touch screen to the other party during the call setup process or during the call, a function of receiving the touch screen information (video call screen) and the touch control information from the other party, a function of filtering and converting the touch input information produced by the interaction with the user by a method described in the touch control information, and a function of transmitting the touch input information to the other party. These functions can be implemented by software or hardware manners. As the touch information communication terminal 200, any terminals, which can support the video call and generate coordinates such as the touch screen, can be used. For example, the touch information communication terminal 200 may be a 3G mobile phone, an Internet phone (VoIP) terminal, or a soft phone of a computer (PC). In particular, in the case of the soft phone of the computer, the touch screen apparatus may be imitated by using a mouse instead of the touch screen.

In order to receive the touch input information, the touch screen information providing apparatus 300 transmits the touch control information to the touch information communication terminal 200 including the touch screen by a signal protocol that is supported by each telephone communication network 100, receives and analyzes the touch input information, and performs operations corresponding thereto. The touch screen information providing apparatus 300 performs a function of making a phone call or answering the phone, a function of recognizing a message notifying the mounting of the touch screen transmitted by the other party during the call setup process or during the call, a function of transmitting the touch control information to the other party, and a function of receiving and analyzing the touch input information transmitted by the other party. These functions can be implemented by the software or hardware manners. The touch screen information providing apparatus 300 may be the 3G mobile phone, the Internet phone terminal, the soft phone of the computer, etc., and may be the dedicated phone receiving apparatus such as an automatic response system (ARS) or a video response system (VRS).

In the case of a touch information communication terminal 210 or a touch screen information providing apparatus 310 that is included in the 3G mobile communication network 110, the 3G mobile communication network 110 can transmit and receive a signal to and by the H.245 signal protocol.

The video gateway 150 should convert a general call signal as well as a touch information related call signal when a call is made between heterogeneous networks like the touch information communication terminal 210 of the 3G mobile communication network 110 and the touch screen information providing apparatus 360 of the broadband converged network 160.

In the case of the touch information terminal 260 or the touch screen information providing apparatus 360 that are included in the broadband converged network 160, the broadband converged network 160 transmits and receives to and from a signal by an SIP signal protocol.

Figure 2:
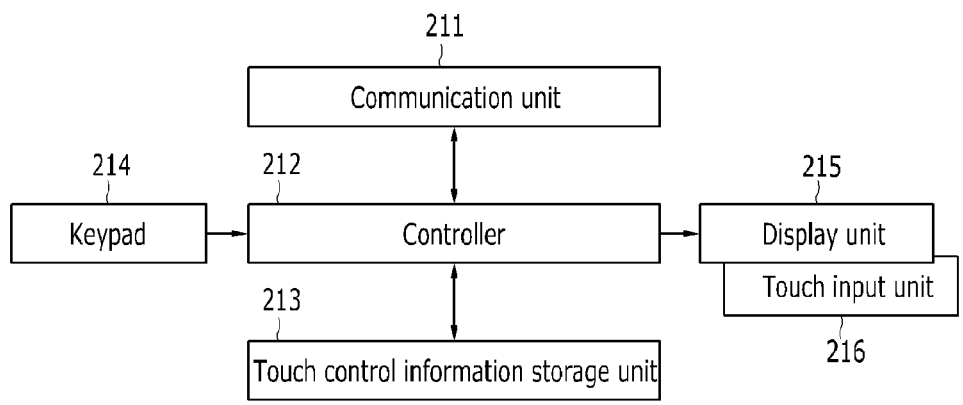
FIG. 2 is a block diagram schematically showing an inner configuration of the touch information communication terminal that receives the touch control information and transmits the touch input information, according to an exemplary embodiment of the present invention.

FIG. 2 is a block diagram schematically showing an inner configuration of the touch information communication terminal that receives the touch control information and transmits the touch input information, according to an exemplary embodiment of the present invention.

The touch information communication terminal according to the exemplary embodiment of the present invention, which is a terminal transmitting and receiving the touch information to and from the external touch screen information providing apparatus 300 through the telephone communication network 100, includes a communication unit 211, a controller 212, a touch control information storage unit 213, a keypad unit 214, a display unit 215, and touch input unit 216.

The communication unit 211 performs a communication function with the external touch information communication terminal 300 through the telephone communication network 100.

The controller 212 controls to transmit a call signal, which includes information notifying the touch communication terminal during the call setup process or during the call, in particular, during the call immediately after the call setup is completed, to the external touch screen information providing apparatus 300.

When the controller 212 receives the touch screen information and the touch control information that is information corresponding to the touch screen information from the external touch screen information providing apparatus 300 during the call, it displays the touch screen information on a display unit 215 and stores the touch control information in the touch control information storage unit 213.

The controller 212 filters and converts the touch input information input from the touch input unit 216 based on the contents of the control information stored in the touch control storage unit 213.

The controller 212 controls to transmit the converted touch input information to the external touch screen information providing apparatus 300 by the method described in the touch control information.

The touch control information storage unit 213 stores the touch control information that indicates how to filter and process the input touch input information and deletes the old information when new touch control information is received.

The keypad unit 214 directly receives the user's selection if necessary to generate a DTMF value.

The display unit 215 displays information according to the control of the controller 212, in particular, displays the touch screen information. The touch screen information mainly includes a screen to select any ones on a screen and may be the other screen.

The touch input unit 216 is attached to the display unit 215 and receives the user's selection by the touch.

Review in detail the case where the controller 212 includes information notifying the touch communication terminal during the call setup process or during the call, in particular, during the call immediately after the call setup is completed, in the call setup through the communication unit 211. The case can be classified into a first case where the touch information communication terminal 200 performs an origination attempt, a second case where the touch information communication terminal 200 responds the phone call, and a third case where the touch information communication terminal 200 is busy, in particular, is busy immediately after the call setup is completed according to the call state. In addition, the signal protocol is changed according to whether the touch information communication terminal 200 is the terminal of the 3G mobile communication network 110 or the terminal of the broadband converged network 160 and the notification display format of the touch information communication terminal 200 is changed accordingly.

In the first case, the touch information communication terminal 260 of the broadband converged network 160 performs the notification display at a promised position in an SIP Invite message (origination attempt message). For example, a header field called as a "touch screen" is added to a Supported header of the SIP Invite message or "1" is displayed at a specific position of a header field of a User-Agent header, thereby making it possible to insert the notification display.

The touch information communication terminal 210 of the 3G mobile communication network 110 performs the notification display at the specific field of the initial address message (IAM) (origination attempt message) of the SS7 signal.

In the second case, the touch information communication terminal 260 of the broadband converged network 160 performs the notification display at a promised position of an SIP 200 OK message (call response message). For example, a header field called as a "touch screen" is added to a Supported header of the SIP 200 OK message or "1" is displayed at a specific position of a header field of a User-Agent header, thereby making it possible to insert the notification display. The touch information communication terminal 210 of the 3G mobile communication network 110 can perform the notification display at a specific field of an answer message (ANM: call response message) of the SS7 signal.

In the third case, the touch information communication terminal 260 of the broadband converged network 160 performs the notification display at a promised position of an SIP Info message that is an information transmission call signal. For example, a header field called as a "touch screen" is added to a Supported header of the SIP Info message or "1" is displayed at a specific position of a header field of a User-Agent header, thereby making it possible to insert the notification display. The touch information communication terminal 210 of the 3G mobile communication network 110 performs the notification display at a Vendor ID character string of a H.245 VendorIdentification message that exchanges between terminals immediately after the call setup is completed.

The controller 212 receives the touch control information from the touch screen information providing apparatus 300 during the call. Herein, at least the filtering, conversion, transmission methods of the touch input information are described in the touch control information. The touch input information produced by touching the touch input unit 216 of the touch screen is basically configured of coordinates that are touched by the user and the user behavior. Herein, the user behavior includes a touchdown, a double touchdown, movement in the touched state, and a touchup and when the dual touch screen is mounted, includes a dual touchdown, and a dual touch movement. The filtering method of the touch input information processes the touch input information that is input at the specific touch area based on the touch area defined in the touch control information, the user behavior, or a combination thereof and is generated by the specific user behavior.

The conversion method of the touch input information includes a method of transmitting the touch input information, that is, a method of transmitting the coordinates and the user behaviors and a method of transmitting the DTMF signals corresponding to the coordinates of the touch input information by mapping the DTMF values per a specific touch area.

As the method of transmitting the touch input information, there is a method of transmitting the touch input information to the SIP Info message of the SIP signal protocol or the H.245 UserInputIndication message of the H.245 signal protocol. In addition, as the method of transmitting the touch input information, there is a method of carrying and transmitting the DTMF value as one corresponding to the touch input information converted into the DTMF value as a method defined in a RTF medium protocol or a method of carrying and transmitting a DTMF frequency signal on an audio medium.

Whenever the controller 212 receives the touch control information from the touch screen information providing apparatus 300, the filtering, conversion, and transmission method can be reconfigured.

The controller 212 filters and converts the touch input information as designated in the touch control information and transmits the touch input information to the touch screen information providing apparatus 300 by the designated transmission method when the user generates the touch input information by touching the touch input unit 216 during the call.

Figure 3:
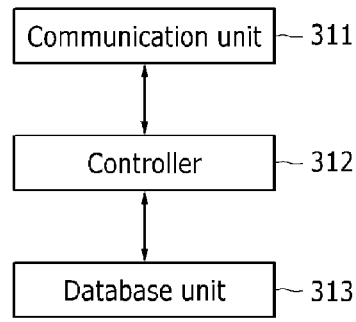
FIG. 3 is a block diagram schematically showing an inner configuration of the touch screen information providing apparatus that transmits the touch control information and receives the touch input information, according to the exemplary embodiment of the present invention.

FIG. 3 is a block diagram schematically showing an inner configuration of the touch screen information providing apparatus that transmits the touch control information and receives the touch input information, according to the exemplary embodiment of the present invention.

The touch screen information providing apparatus 300 according to the exemplary embodiment of the present invention includes a communication unit 311, a controller 312, and a database unit 313.

The communication unit 311 performs the communication function with the external touch information communication terminal 200 through the telephone communication network 100.

The database unit 313 stores a set of the touch screen information to be displayed on the screen and the touch control information.

The controller 312 fetches the touch screen information and the touch control information from the database unit 313 and transmits it to the touch information communication terminal 200 when receiving the call signal including the information notifying the touch communication terminal from the external touch information communication terminal 200 through the communication unit 311 during the call setup process or during the call.

The controller 312 fetches second touch screen information and second touch control information corresponding to the touch input information from the database unit 313 and transmits it to the touch information communication terminal 200, when grasping the call signal or the touch input information received from the external touch information communication terminal 200.

The controller 312 analyzes the SIP Invite, the IAM message, the SIP 200 OK, theM message, the SIP Info, and the H.245 VendorIdentification message received from the terminal of the other party during the call setup process or during the call to determine whether the terminal of the other party is the touch information communication terminal 200.

If the controller 312 determines that the terminal of the other party is not the touch information communication terminal 200, the controller 312 does not transmit the touch control information.

The controller 312 transmits the touch control information to the touch information communication terminal 200 when it needs the specific touch input information from the touch information communication terminal 200 during the call. For example, when it is considered that the video automatic response system performs a role of the touch screen information providing apparatus 300, it displays menu information as the touch screen information to the touch information communication terminal 200, transmits the touch control information corresponding to the menu screen, and receives the touch input information, which indicates menus, from the touch information communication terminal 200.

The touch control information designates "application/tspkg" in a Content-Type header of the SIP Info and designates the touch area, conversion method, and transmission method for filtering in a payload part in the case of the touch screen information providing apparatus 360 of the broadband converged network 160.

In the case of the touch screen information providing apparatus 310 of the 3G mobile communication network 110, the touch area, conversion method, and transmission method are designated in a User Input Parameter field of a H.245 UserInputIndication message.

Hereinafter, an operation of transmitting and receiving touch information between the touch information communication terminal 200 and the touch screen information providing apparatus 300 will be described.

First, the messages used in the exemplary embodiment of the present invention will be described below. The broadband converged network 160 uses, as a signal protocol, the session initiation protocol (SIP) defined in an RFC3261 standard and the 3G mobile communication network 110 uses signal system 7 (SS7) and H.245 that are defined in ITU-T.

The broadband converged network 160 uses as a medium protocol, a Realtime Transport Protocol (RTP) that is defined in an RFC3550 standard and uses H.324M that is defined in ITUT.

The SIP message is configured of "Request/Response Line" that indicates request/response such as SIP Invite, 200 OK, a header set such as an example of Supported, User-Agent that can indicate various information such as sender and receiver information, support ability, etc., and a payload part that includes more detailed information.

The H.245 signal protocol is a control signal protocol of a binary format that is used to exchange necessary information for terminal performance and multimedia communication between the terminals in the 3G mobile communication network 110, and in particular, H.245 VendorIdentification, UserInputIndication messages are important.

Figure 4:
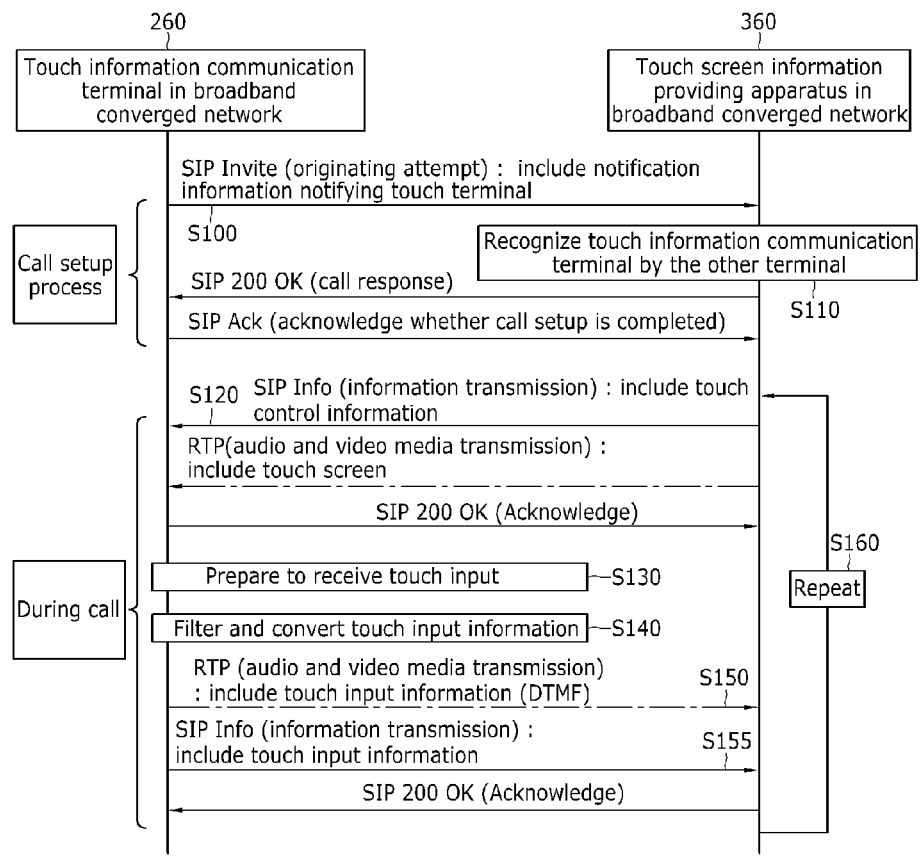
FIG. 4 is an operation flowchart showing a case where the touch information communication terminal makes a phone call to the touch screen information providing apparatus in the broadband converged network according to the exemplary embodiment of the present invention.

FIG. 4 is an operation flowchart showing a case where the touch information communication terminal makes a phone call to the touch screen information providing apparatus in the broadband converged network according to the exemplary embodiment of the present invention.

The touch information communication terminal 260 starts to make a phone call to the touch screen information providing apparatus 360.

The controller 212 of the touch information communication terminal 260 transmits the origination attempt call signal (SIP invite message) including the notification information notifying the touch information communication terminal 260 to the touch screen information providing apparatus 360 of the broadband converged network 160 (S100).

The following [Table 1] is an example of the origination attempt call signal (SIP Invite message) transmitted from the touch information communication terminal 260 in the broadband converged network 160.

It can be appreciated that the SIP Invite message has the Supported header part into which the contents called as the touch screen is inserted and may use the User-agent header instead of the Supported header if necessary.

TABLE 1

| Request Line | Headers | Payload |
| --- | --- | --- |
| INVITE tel: 07010041004 | Supported: touchscreen<br>. . . | . . . |

When the touch screen information providing apparatus 360 receives the origination attempt call signal, it is recognized that the terminal of the other party is the touch information communication terminal 260 including the touch input unit 216 (S110). In addition, the touch screen information providing apparatus 300 transmits the SIP 200 OK call response message to the touch information communication terminal 260 according to the SIP signal protocol and receives the SIP Ack message from the touch information communication terminal 260, such that it becomes the busy state.

When the touch screen information providing apparatus 360 transmits the touch screen information for transmitting the audio and video media by the RTP protocol and transmits the SIP Info message including the touch control information to the touch information communication terminal 260, it receives the SIP 200 OK message as a response for the SIP Info message (S120).

The touch screen information may be a simple still image or a moving image and may be image transmitted from the external apparatus such as a camcorder in real time.

Figure 5:
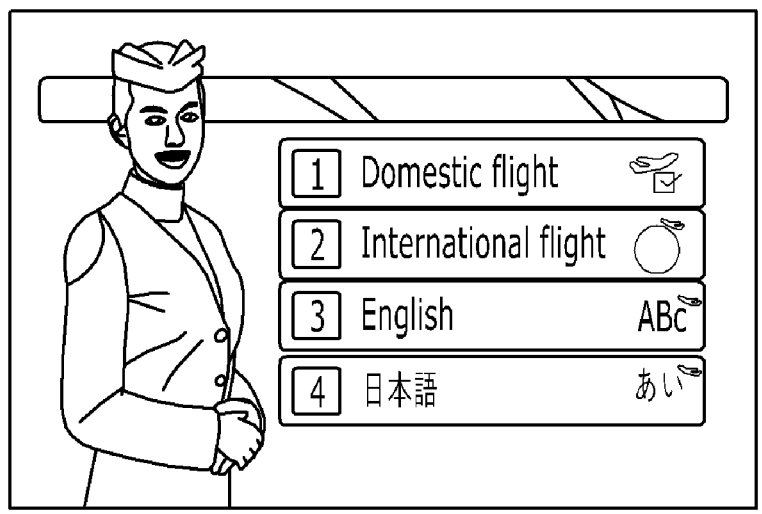
FIG. 5 is a diagram showing one example of a display unit screen of a touch information communication terminal according to an embodiment of the present invention.

FIG. 5 shows the case where each of the DTMF signals 1, 2, 3, and 4 is pressed when selecting domestic flight, international flight, English, Japanese menus viewing the screen as one example of the touch screen information.

The following [Table 2] is an example of the SIP Info message including the touch control information transmitted from touch screen information providing apparatus 360 in the broadband converged network 160.

TABLE 2

| Request Line | Headers | Payload |
|---|---|---|
| INFO tel: 07010091009 | Content-Type: application/tspkg ... | m = control<br>s = 352, 288<br>r = b/167, 76, 321, 114/dtmf/1<br>r = b/167, 118, 321, 156/dtmf/2<br>r = b/167, 159, 321, 198/dtmf/3<br>r = b/167, 202, 321, 241/dtmf/4 |
| INFO tel: 07010091009 | Content-Type: application/tspkg ... | m = control<br>s = 176, 144<br>r = c/30, 80, 10/dfmf/2<br>r = b/10, 10, 160, 120/sip-info/down, move, up |

The first line of [Table 2] shows the touch control information that corresponds to the touch screen information of FIG. 5. The touch related information message can be appreciated by the Content-Type as a Payload format (tspkg: touch screen package) and the Payload represents the touch control information by designating the value of the parameter m as the control in the Payload part.

A value of a parameter s indicates that all coordinates represented in the Payload as a size of the touch screen is prepared based on the parameter s. The touch control information designates the definition, conversion method, and transmission method of the touch area for filtering. For example, "r=b/167,76,321,114/dtmf/1" has a meaning "convert the touch input generated in a rectangle area defined from left upper ends 167 and 76 to right lower ends 321 and 114 into 1 that is the DTMF signal value and transmit it to the RTP". The information corresponds to the domestic menu of the touch screen information. In addition, it may include content corresponding to international flight, English, Japanese menus.

The second line of [Table 2] shows that there is no need to fix the touch area as a rectangle area. "r=c/30,80,10/dtmf/2" has a meaning "transmit 2 that is the RTP DTMF signal value when a circle having central coordinates of 30 and 80 and a radius of 10 as a touch area is touched". "r=b/10,10,160,120/sipinfo/down,move,up" has a meaning "transmit a series of the touch input information, which is touched down, moves in the state of the touched state, or touched up in the rectangle area defined by 10 and 10 and 160 and 120, as it is without being converted by using SIP Info message. "r=b/10, 10, 160,120/sipinfo/down,move,up" is needed to receive a user's signature operation that is made in a signature area on a screen on which a signature is performed, in FIG. 6.

When the touch information communication terminal 260 receives the touch control information, it prepares to receive the touch input from the user (S130).

The controller 212 converts the touch screen information to meet the size of the display unit 215, displays the touch screen on the display unit 215 according to the touch screen information, and converts the touch control information and stores it in the touch control information storage unit 213.

The user of the touch information communication terminal 210 touches the touch screen displayed on the display unit 215 and the touch input unit 216 generates and outputs the touch input information. For example, when the screen is displayed as shown in FIG. 5, the touch input information can be produced in the case where the international menu area is touched. Further, in the case of the touch control information on the screen as shown in FIG. 6, the touched input itself produces the touch input information.

The controller 212 performs the filtering and conversion on the touch input information according to the contents defined in the touch control information (S140). For example, when the user touches a leftmost upper end that does not belong to any areas in the screen of FIG. 6, the controller 212 does not have the information corresponding to the touch control information, such that it does not transmit the touch input information to the touch screen information providing apparatus 360. When the user touches the domestic flight area, the controller 212 converts the touch input information into the DTMF signal "1" according to the touch control information.

The controller 212 transmits as the DTMF signal value the converted touch input information through the RTP by the method designated in the touch control information (S150) or transmits it through the SIP Info message (S155).

Figure 6:
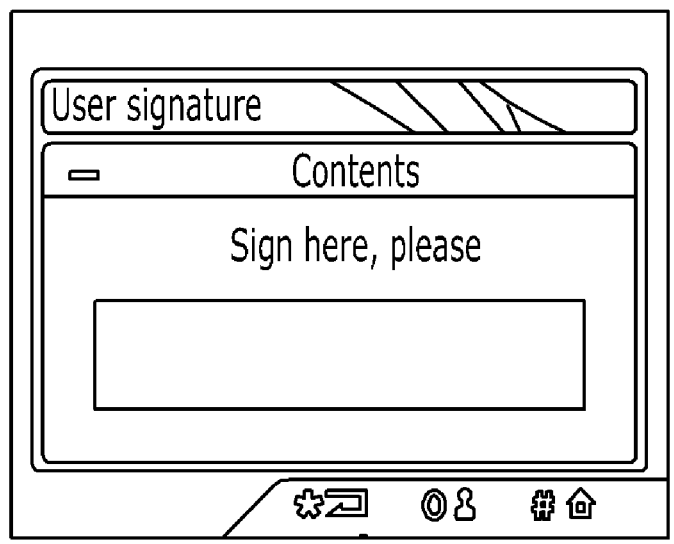
FIG. 6 is a diagram showing another example of a display unit screen of a touch information communication terminal according to an embodiment of the present invention.

The following [Table 3] is an example of transmitting a series of touch input information by using the touch screen information of FIG. 6 and the SIP Info message corresponding to the second line of the above-mentioned [Table 2].

TABLE 3

| Request Line | Headers | Payload |
|---|---|---|
| INFO tel: 07010041004 | Content-Type: application/tspkg ... | m = event<br>e = 15, 15/down<br>e = 17, 15/move<br>e = 25, 17/move<br>...<br>e = 77, 101/up |

It can be appreciated that the header value of the Content-Type is the touch related information transmitting call and it can be appreciated that the Payload includes the touch input information since a value of a parameter m is an event in the Payload part. When analyzing a list of a parameter e, the user touchdowns at point (15, 15) and signs his/her own autograph while continuously moving in the touched state and stops a signature at point (77,101).

It is preferable that the controller 212 sequentially transmits the SIP Info message several times when a large amount of the touch input information is generated.

The controller 312 of the touch screen information providing apparatus 360 receives and analyzes the touch input information from the touch information communication terminal 260 and transmits the SIP OK message as the response for the SIP Info message to the touch information communication terminal 260. The above-mentioned steps are repeated until the call is ended (S160).

Figure 7:
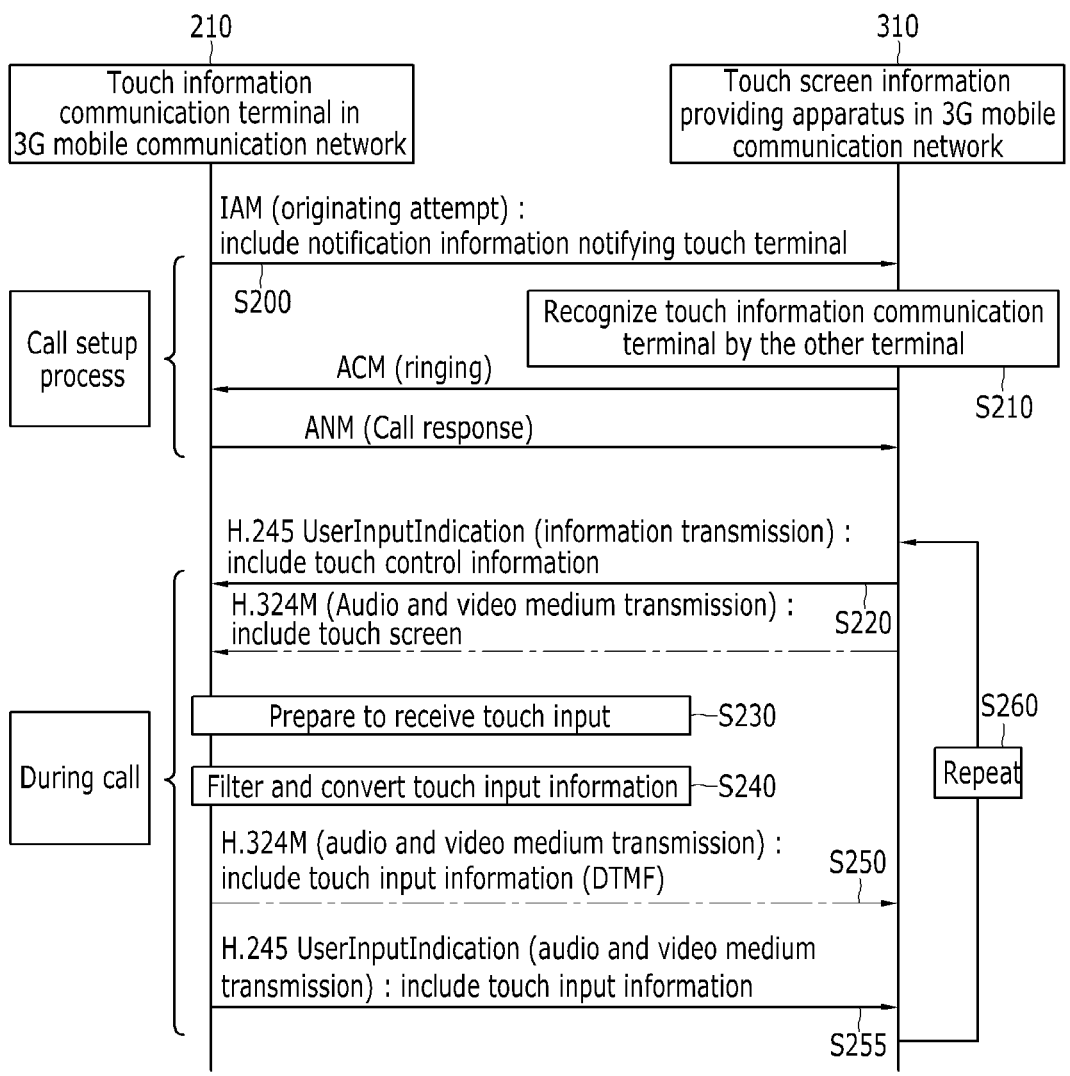
FIG. 7 is an operation flowchart showing a case where the touch information communication terminal makes a phone call to the touch screen information providing apparatus in the 3G mobile communication network according to the exemplary embodiment of the present invention.

FIG. 7 is an operation flowchart showing a case where the touch information communication terminal makes a phone call to the touch screen information providing apparatus in the 3G mobile communication network according to the exemplary embodiment of the present invention.

The 3G mobile communication network 110 can exchange the user information by using as the signal protocol the SS7 for the call setup and the H.245 during the call.

The user of the touch information communication terminal 210 starts to make a phone call to the touch screen information providing apparatus 310.

The controller 212 of the touch information communication terminal 210 transmits the origination attempt call signal (IAM message) including the notification information notifying the touch information communication terminal 210 (S200).

The following [Table 4] is an example of the origination attempt call signal (IAM message) transmitted from the touch information communication terminal 210 in the 3G mobile communication network 110.

TABLE 4

| Message Type | Nature of Connection Indication | Forward Call Indicators | Calling Party;s Category | Called Party Number | ... | User to User Indicators |
|---|---|---|---|---|---|---|
| IAM | ... | ... | ... | ... | ... | 0001000 |

The notification information is stored at a specific position (fourth bit) of a user to user Indicators (UUI) parameter. If the fourth bit is 1, it indicates that the origination terminal is the touch information communication terminal 210 having the touch input unit 216. How to store the notification information in any parameter of the IAM message can be different according to a provider.

When the touch screen information providing apparatus 310 receives the origination attempt call signal, it recognizes that the terminal of the other party is the touch information communication terminal 210 having the touch input unit 216 (S210).

The touch screen information providing apparatus 310 transmits the ACM and ANM signals to the touch information communication terminal 210 according to the SS7 signal protocol, such that it is busy.

In the state where a line is busy, the H.245 signal can be transmitted and received between the touch information communication terminal 210 and the touch screen information providing apparatus 310.

The 3G mobile communication network 110 can transmit and receive the H.245 VendorIdentification signal to and from the terminal of the other party, wherein the H.245 VendorIdentification signal can be used to notify its own performance to the terminal of the other party, immediately after the call setup is completed.

The touch screen information providing apparatus 310 transmits the touch screen information according to the audio and video codec protocol of the H.324M and transmits the H.245 UserInputIndication message including the touch control information to the touch information communication terminal 210 (S220).

The following [Table 5] is an example of an H.245 UserInputIndication message transmitted from the touch screen information providing apparatus 310 in the 3G mobile communication network 110.

| User Input Parameter | | | | | |
|---|---|---|---|---|---|
| SycType | Operation | OpParameter | Charset | Length | Data |
| 0x85 | 1 | ... | ... | 227 | ('b', 167, 76, 321, 114, 'd', '1') |
| | | | | | ('b', 167, 118, 321, 156, 'd', '2') |
| | | | | | ('c', 30, 80, 10, 'd', '2') |
| | | | | | ('b', 10, 10, 160, 120, 'i', 'dtmu') |
| | | | | | ... |

The above-mentioned [Table 5] shows encoded touch control information of a User Input Parameter field in the H.245 UserInputIndication message. 0x85 of a SycType indicates that the H.245 UserInputIndication message is the touch related information message (the same role as the Content-Type header of the SIP Info message of [Table 2]) and 1 of an Operation field indicates that the H.245 UserInputIndication message is the touch control information (the same role as the parameter m of the Payload part of the SIP Info message of [Table 2]).

Length stores an actual length of a Data field and the actual touch control information is stored in the Data field in a binary format. The contents of the Data field are similar to the Payload part of the above-mentioned [Table 2] and therefore, the detailed description thereof will be omitted.

When the touch information communication terminal 210 receives the touch control information, it prepares to receive the touch input from the user and performs the filtering and conversion on the touch input information as defined in the touch control information (S230 and S240).

The controller 212 transmits as the DTMF signal value the converted touch input information through the audio medium of the H.324M or the standard H.245 DTMF message by the method designated in the touch control information (S250) or transmits it to the touch screen information providing apparatus 310 through the H.245 UserInputIndication message (S255).

The following [Table 6] is an example of an H.245 UserInputIndication message including the touch input information transmitted from the touch information communication terminal 210 in the 3G mobile communication network 110.

TABLE 6

| User Input Parameter | | | | | |
|---|---|---|---|---|---|
| SycType | Operation | OpParameter | Charset | Length | Data |
| 0x85 | 2 | ... | ... | ... | (15, 15, 'd') |
| | | | | | (17, 15, 'm') |
| | | | | | ... |
| | | | | | (25, 17, 'm') |
| | | | | | (77, 101, 'u') |

The H.245 UserInputIndication message designates 2 in an Operation field to indicate that it includes the final touch input information. The contents of the Data field are the same as the Payload part of the above-mentioned [Table 3] and therefore, the detailed description thereof will be omitted.

The controller 312 of the touch screen information providing apparatus 310 receives and analyzes the touch input information and performs the operations corresponding thereto. The above-mentioned steps are repeated until the call is ended (S260).

Figure 8:
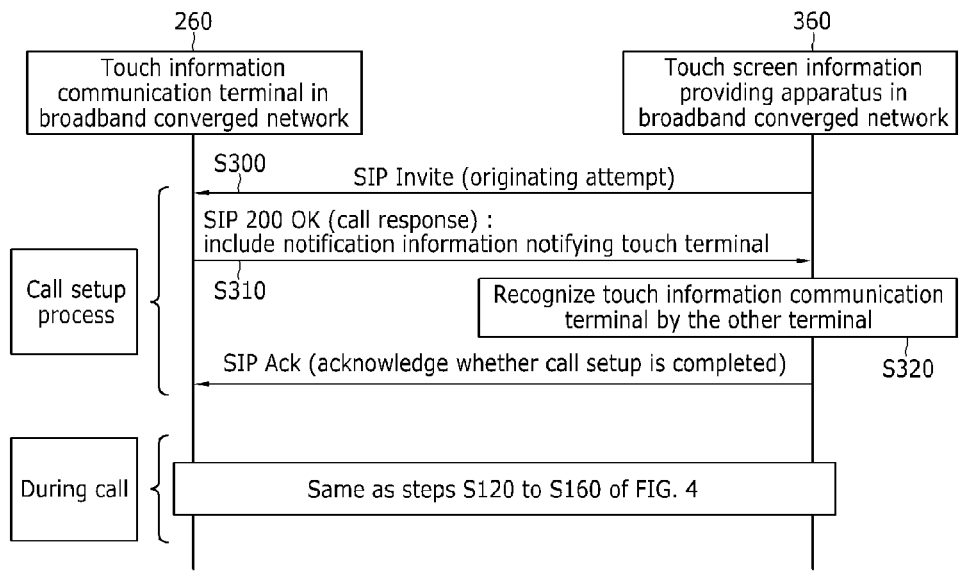
FIG. 8 is an operation flowchart showing the case where the touch screen information providing apparatus in the broadband converged network according to the exemplary embodiment of the present invention makes a telephone call to the touch information communication terminal.

FIG. 8 is an operation flowchart showing the case where the touch screen information providing apparatus in the broadband converged network according to the exemplary embodiment of the present invention makes a telephone call to the touch information communication terminal.

The user of the touch screen information providing apparatus 360 starts to make a telephone call to the touch information communication terminal 260.

The touch screen information providing apparatus 360 transmits the general origination attempt call signal (SIP Invite message) to the touch information communication terminal 260 (S300). The controller 212 of the touch information communication terminal 260 transmits the call response signal (SIP 200 OK message) including the notification information notifying the touch information communication terminal 260 to the touch screen information providing apparatus 360 (S310).

The following [table 7] is an example of the call response signal (SIP 200 OK message) transmitted from the touch information communication terminal 260 in the broadband converged network 160.

TABLE 7

| Response Line | Headers | Payload |
| --- | --- | --- |
| SIP/2.0 200 OK | Supported: touch screen ... | ... |

The call response signal (SIP 200 OK message) has a Supported header part into which the contents called as the touch screen is inserted.

When the touch screen information providing apparatus 360 receives the call response signal, it recognizes that the terminal of the other party is the touch information communication terminal 260 having the touch input unit 216 (S320).

The touch information communication terminal 260 receives the SIP Ack message from the touch screen information providing apparatus 360 according to the SIP signal protocol, such that it is busy. The following steps during the call are the same as steps S120 to S160 of FIG. 4 and therefore, the detailed description thereof will be omitted.

Figure 9:
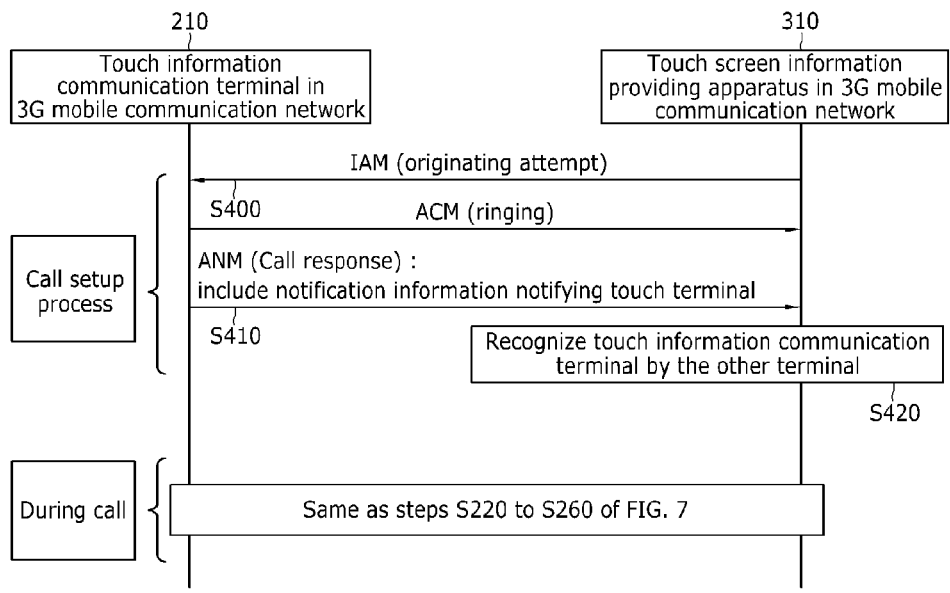
FIG. 9 is an operation flowchart showing the case where the touch screen information providing apparatus makes a phone call to the touch information communication terminal in the 3G mobile communication network according to the exemplary embodiment of the present invention.

FIG. 9 is an operation flowchart showing the case where the touch screen information providing apparatus makes a phone call to the touch information communication terminal in the 3G mobile communication network according to the exemplary embodiment of the present invention.

The touch screen information providing apparatus 310 transmits the IAM message to the touch information communication terminal 210 to perform the origination attempt (S400).

The touch information communication terminal 210 transmits the ACM message for ringing to the touch screen information providing apparatus 310.

The controller 212 of the touch information communication terminal 210 transmits the call response signal (ANM message) including the notification information notifying the touch information communication terminal 210 to the touch screen information providing apparatus 310 (S410).

The following [Table 8] is an example of the call response signal (ANM message) transmitted from the touch information communication terminal 210 in the 3G mobile communication network 110.

TABLE 8

| Message Type | ... | User to User Indicators |
| --- | --- | --- |
| ANM | ... | 0001000 |

The notification information is stored at a specific position (fourth bit) of the user to user Indicators (UUI) parameter such as the example of the IAM message of the above-mentioned [Table 4].

When the touch screen information providing apparatus 310 receives the call response signal, it recognizes that the terminal of the other party is the touch information communication terminal 210 having the touch input unit 216 (S420). The following steps process during the call are the same as steps S220 to S260 of FIG. 7 and therefore, the detailed description thereof will be omitted.

Figure 10:
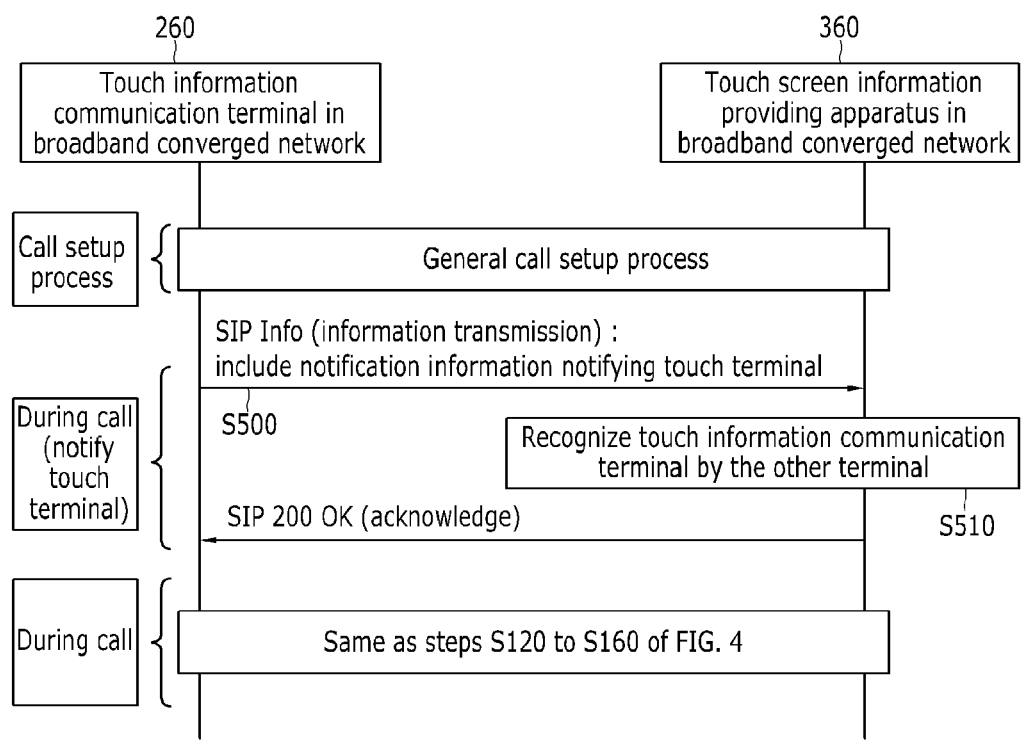
FIG. 10 is an operation flowchart showing the case where the touch information communication terminal transmits the information transmission call signal (SIP Info message) including the notification information notifying the touch information communication terminal during the call in the broadband converged network according to the exemplary embodiment of the present invention.

FIG. 10 is an operation flowchart showing the case where the touch information communication terminal transmits the information transmission call signal (SIP Info message) including the notification information notifying the touch information communication terminal during the call in the broadband converged network according to the exemplary embodiment of the present invention.

As shown in FIGS. 4 and 8, it is convenient to transmit the notification information during the call setup process but the call setup process starts after performing the general Invite 200 OK SIP Ack transmission and reception process to be compatible with the 3G mobile communication network 110 independently of whether any apparatus is in an origination state or a termination state.

As shown in FIG. 10, after the general call setup process is completed, the touch information communication terminal 260 transmits the information transmission call signal (SIP Info message) including the notification information notifying the touch information communication terminal 260 to the touch screen information providing apparatus 360 (S500).

The following [Table 9] is an example of the information transmission call signal (SIP Info message) transmitted from the touch information communication terminal 260 in the broadband converged network 160.

TABLE 9

| Request Line | Headers | Payload |
| --- | --- | --- |
| INFO tel: 07010091009 | Supported: touch screen Content-Type application/tspkg ... | m = info vi = ver2.3T |

The Content-Type is designated as application/tspkg to notify that it is the touch related message and indicates the touch information communication terminal 260 having the touch input unit in the Supported header.

A parameter vi of the Payload part is a parameter that is used when the telephone is connected between the touch information communication terminal 260 and the touch screen information providing apparatus 360 that are the heterogeneous networks.

The touch screen information providing apparatus 360 disregards the SIP Info message that cannot analyze the Content-Type when the terminal of the other party is not the touch information communication terminal 260 and transmits the SIP 200 OK Ack message and continuously performs a call.

When the touch screen information providing apparatus 360 receives the information transmission call signal (SIP Info message), it recognizes that the terminal of the other party is the touch information communication terminal 260 having the touch input unit 216 (S510).

The following steps are the same as steps S120 to S160 of FIG. 4 and therefore, the detailed description thereof will be omitted.

Figure 11:
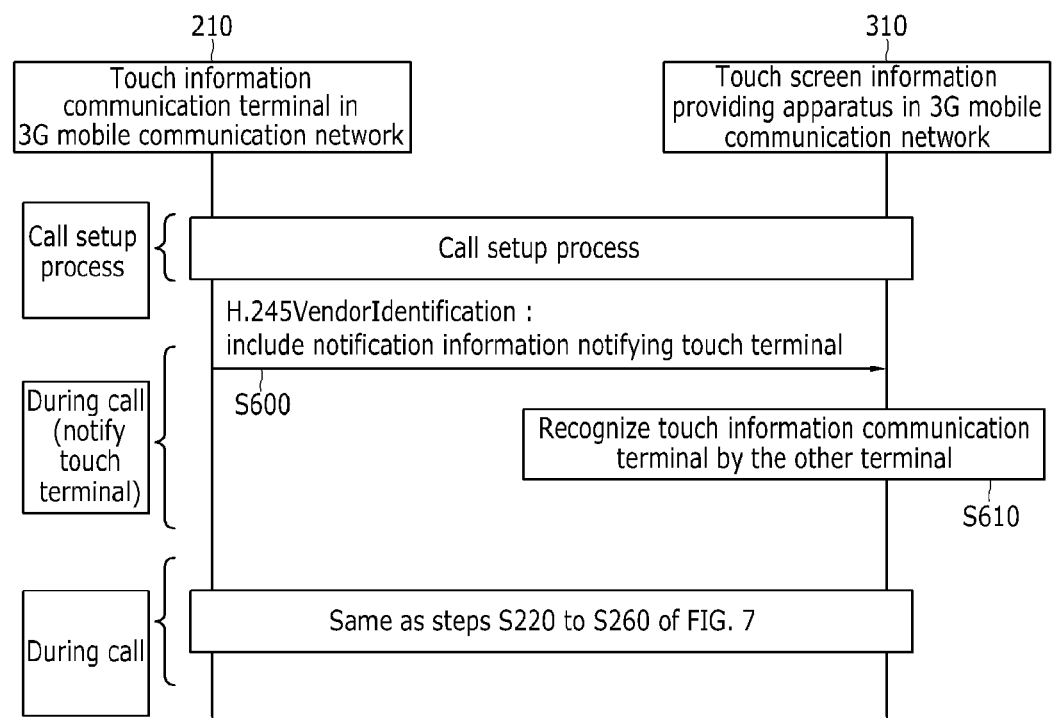
FIG. 11 is an operation flowchart showing the case where the touch information communication terminal transmits the information transmission call signal (SIP Info message) including the notification information notifying the touch information communication terminal during the call in the 3G mobile communication network according to the exemplary embodiment of the present invention.

FIG. 11 is an operation flowchart showing the case where the touch information communication terminal transmits the information transmission call signal (SIP Info message) including the notification information notifying the touch information communication terminal during the call in the 3G mobile communication network according to the exemplary embodiment of the present invention.

The call setup process is an IAM-ACM-ANM transmission/reception process independently of whether any apparatus is in an origination state or a termination state.

As shown in FIG. 11, after the general call setup process is completed, the touch information communication terminal 210 transmits the information transmission call signal (H.245 VendorIdentification) including the notification information notifying the touch information communication terminal 210 to the touch screen information providing apparatus 310 (S600).

The following [Table 10] is an example of the information transmission call signal (H.245 VendorIdentification) transmitted from the touch information communication terminal 210 in the 3G mobile communication network 110.

TABLE 10

| VendorID |
| --- |
| ver2.3T |

The notification information can be determined according to whether there is a capital letter T after a version character string of the VendorID field value but the notification information can be defined in another format if necessary.

When the touch screen information providing apparatus 310 receives the information transmission call signal (H.245 VendorIdentification), it recognizes that the terminal of the other party is the touch information communication terminal 210 having the touch input unit 216 (S610).

The following steps are the same as steps S220 to S260 of FIG. 7 and therefore, the detailed description thereof will be omitted.

Figure 12:
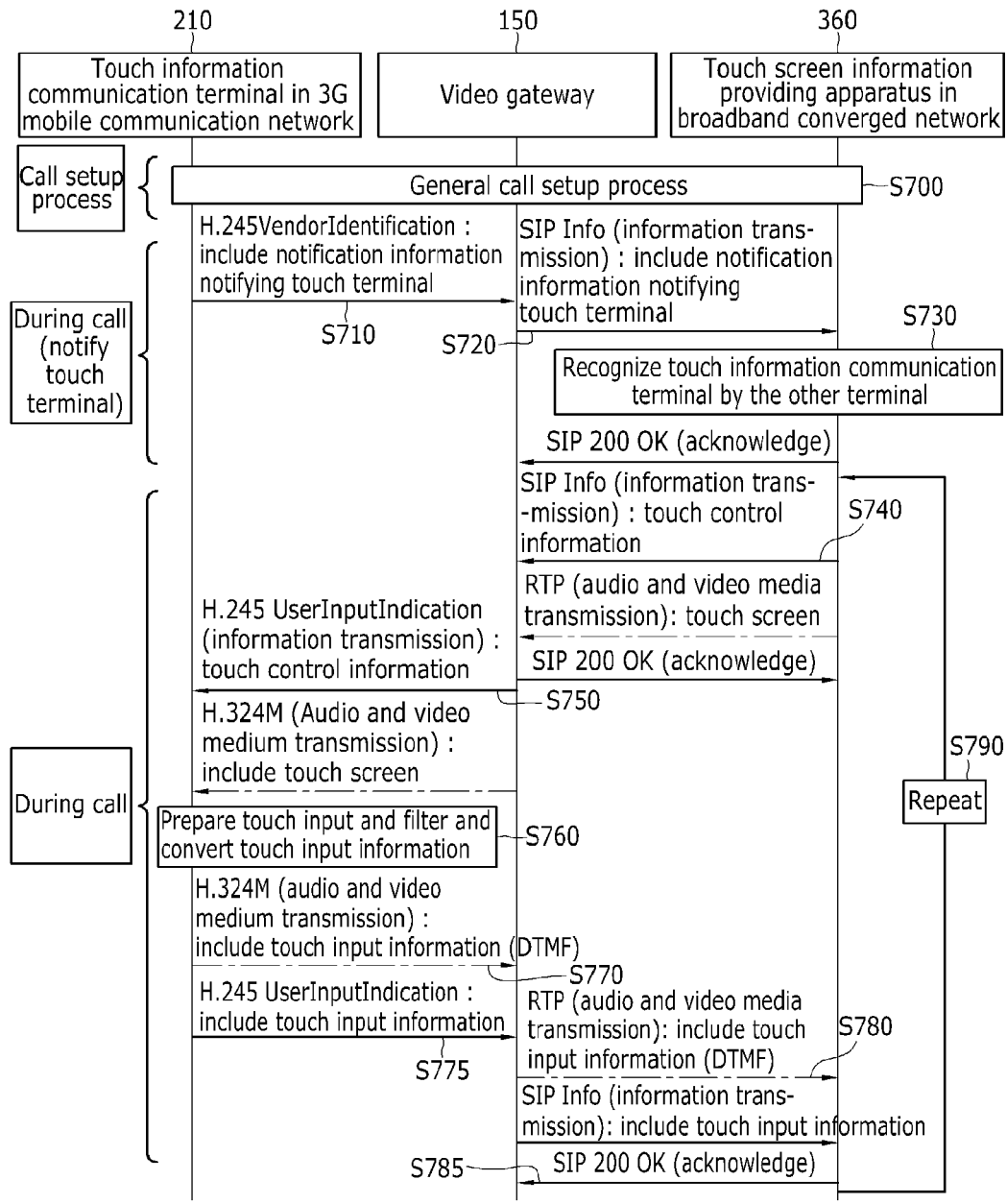
FIG. 12 is an operation flowchart showing a case where the touch information communication terminal in 3G mobile communication network according to the first exemplary embodiment of the present invention makes a phone call to the touch screen information providing apparatus that exists in the broadband converged network.

FIG. 12 is an operation flowchart showing a case where the touch information communication terminal in 3G mobile communication network according to the first exemplary embodiment of the present invention makes a phone call to the touch screen information providing apparatus that exists in the broadband converged network.

The exemplary embodiment of the present invention shows the case where the notification information on the touch information communication terminal 210 is transmitted during the call.

In the telephone connection between the heterogeneous networks that supports the video call, the video gateway 150 inter-converts the signal and the medium in the middle according to the RFC3372 standard.

In the call setup process, the video call starts between the touch information communication terminal 210 and the touch screen information providing apparatus 360 (S700).

After the call setup process is completed, touch information communication terminal 210 transmits the information transmission signals (H.245 VendorIdentification signal, SIP Info message) including the touch terminal notification information to the touch screen information providing apparatus 360 via the vide gateway 150 (S710 and S720). Herein, the touch terminal notification information is information that indicates the touch information communication terminal 210.

When the touch screen information providing apparatus 360 receives the information transmission signal (SIP Info message), it recognizes that the terminal of the other party is the touch information communication terminal 210 (S730).

The touch screen information providing apparatus 360 transmits the information transmission signal (SIP Info message), which includes the touch screen information and the touch control information, to the video gateway 150 (S740). The video gateway 150 performs the signal conversion to transmit the information transmission signal (H.245 UserInputIndication message) including the touch control information to the touch information communication terminal 210 (S750).

The touch information communication terminal 210 receiving the information transmission signal prepares the touch input and performs the filtering and conversion on the touch input information of the user (S760).

The touch information communication terminal 210 transmits the DTMF value by using the medium according to the method of transmitting the touch control information (S770) or transmits the touch input information to the video gateway 150 by using the H.245 UserInputIndication message (S775). The video gateway 150 converts the corresponding medium or the signal into the RTP and the SIP Info message, respectively, to transmit it to the touch screen information providing apparatus 360 (S780 and S785). Then, the controller 312 of touch screen information providing apparatus 360 receiving the touch input information analyzes the touch input information and performs the operations corresponding thereto. The above-mentioned steps are repeated until the call is ended (S790).

Another case where the notification information of the touch information communication terminal 210 during the video call in the terminals between the heterogeneous networks is transmitted during the call is not largely deviated from the operation flowchart of FIG. 12 and therefore, the detailed description thereof will be omitted.

Figure 13:
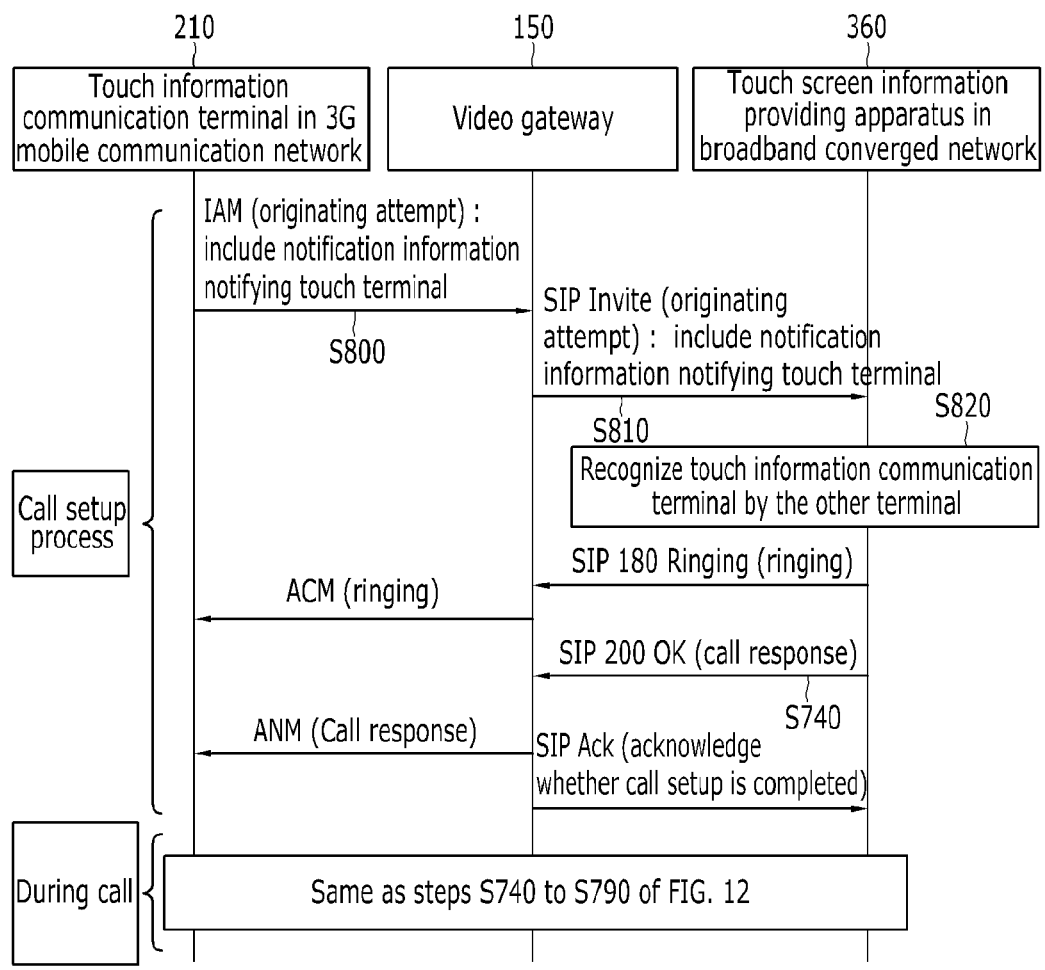
FIG. 13 is an operation flowchart showing the case where the touch information communication terminal of the 3G mobile communication network according to the second exemplary embodiment of the present invention makes a phone call to the touch screen information providing apparatus that exists in the broadband converged network.

FIG. 13 is an operation flowchart showing the case where the touch information communication terminal of the 3G mobile communication network according to the second exemplary embodiment of the present invention makes a phone call to the touch screen information providing apparatus that exists in the broadband converged network.

The exemplary embodiment of the present invention shows the case where the notification information of the touch information communication terminal 210 is transmitted during the call setup process.

The touch information communication terminal 210 starts when the user makes a phone call to the touch screen information providing apparatus 360.

The controller 212 of the touch information communication terminal 210 transmits the origination attempt call signal (IAM message) including the notification information notifying the touch information communication terminal 210 (S800).

The video gateway 150 converts the origination attempt call signal (IAM message) into the origination attempt call signal (SIP Invite message) of the SIP protocol and transmits it to the touch screen information providing apparatus 360 (S810).

The touch screen information providing apparatus 360 recognizes that the terminal of the other party is the touch information communication terminal 210 (S820). The following steps complete the call setup by the general method.

The following operation flow during the call is the same as steps S740 to S790 of FIG. 12 and therefore, the detailed description thereof will be omitted.

Another case where the notification information of the touch information communication terminal 210 is transmitted during the call setup process when the video call is performed in the terminals between the heterogeneous networks is not largely deviated from the operation flowchart of FIG. 13 and therefore, the detailed description thereof will be omitted.

In the above-mentioned all operation flowcharts, the terminal may be the telephone communication apparatus that can simultaneously perform the role of the touch information communication terminal 200 and the role of the touch screen information providing apparatus 300.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to the present invention, the communication terminal including the touch related input unit such as the touch screen or the touch pad, etc. can transmit and receive the touch information during the video call in the telephone communication network.

According to the present invention, the user with the terminal including the touch screen can facilitate the complicated interaction with the other party during the call by the method of touching the touch screen.

The invention claimed is:

1. A touch information communication method of a terminal for transmitting touch information to and receiving touch information from a touch screen information providing apparatus in a telephone communication network, comprising:
   transmitting notification information to the touch screen information providing apparatus by carrying the notification information on a call signal, wherein the notification information notifies the touch screen information providing apparatus that the terminal is a touch communication terminal;
   receiving touch screen information and touch control information corresponding to the touch screen information from the touch screen information providing apparatus in response to the notification information; and
   when a user touches a predetermined area on a screen of the terminal, determining the touched area and transmitting touch input information corresponding to the touched area to the touch screen information providing apparatus.

2. The touch information communication method of claim 1, wherein:
   the transmitting the notification information includes
   transmitting the notification information by carrying the notification information on a session initiation protocol (SIP) invite message in a call setup process.

3. The touch information communication method of claim 1, wherein:
   the transmitting the notification information includes
   transmitting the notification information by carrying the notification information on an initial address message during the call setup process.

4. The touch information communication method of claim 2, wherein:
   the transmitting the notification information includes
   transmitting a response message including the notification information after the SIP invite message is received from the touch screen information providing apparatus.

5. The touch information communication method of claim 3, wherein:
   the transmitting the notification information includes
   transmitting a response message including the notification information to the touch screen information providing apparatus after the initial address message is received from the touch screen information providing apparatus.

6. The touch information communication method of claim 1, wherein:
   the transmitting the notification includes
   transmitting the notification information by carrying the notification information on a session initiation protocol (SIP) Info message during a call after the call setup process is completed.

7. The touch information communication method of claim 1, wherein:
   the transmitting the notification includes
   transmitting the notification information by carrying the notification information on H.245 VendorIdentification during communication after the call setup process is completed.

8. The touch information communication method of claim 1, wherein:
   the touch input information includes information on a coordinate value of a touch input made on a touch input unit by a user and sensed by the touch input unit, information on a coordinate value with user behavior, and information on a dual-tone multi-frequency (DTMF) signal value that corresponds to the sensed coordinate value.

9. A touch information communication method of a touch screen information providing apparatus for transmitting touch information to and receiving touch information from an external terminal, comprising:
   receiving a call signal from the external terminal;
   determining whether the received call signal includes notification information indicating the external terminal is a touch communication terminal;
   transmitting first touch screen information and first touch control information corresponding to the first touch screen information to the external terminal when the received call signal includes the notification information indicates the external terminal is a touch communication terminal; and
   receiving touch input information that corresponds to a touched area from the external terminal.

10. The touch information communication method of claim 9, further comprising:
   transmitting second touch screen information corresponding to the received touch input information and second touch control information corresponding to the second touch screen information to the external terminal.

11. A terminal of transmitting touch information to and receiving touch information to and from a touch screen information providing apparatus, comprising:
   a display unit configured to display touch screen information;
   a touch input unit attached to the display unit, configured to receive touch inputs made by a corresponding user;
   a communication unit configured to perform a communication function with the touch screen information providing apparatus; and
   a controller configured to control operations to transmit a call signal including notification information notifying that the terminal is a touch communication terminal to the touch screen information providing apparatus through the communication unit, to receive touch screen information and touch control information corresponding to the touch screen information from the touch screen information providing apparatus in response to the notification information, and to transmit touch input information corresponding to an area touched by an touch input made on the touch input unit to the touch screen information providing apparatus.

12. The terminal of claim 11, wherein:
the controller controls to transmit a call signal including notification information notifying that the terminal is the touch communication terminal during the call setup process or during the call after the call setup process is completed to the touch screen information providing apparatus.

13. The terminal of claim 11, wherein:
the controller filters and converts the touch input information by a method defined in the touch control information and transmits the converted touch input information to the touch screen information providing apparatus by a designated transmitting method.

14. The terminal of claim 11, wherein:
the controller converts and transmits a coordinate value sensed by the touch input unit into a dual-tone multi-frequency (DTMF) signal value that corresponds to the sensed coordinate value and transmit the DTMF signal value.

15. A touch screen information providing apparatus of transmitting touch information to and receiving from an external terminal, comprising:
a communication unit configured to perform a communication function with the external terminal;
a database configured to store touch screen information to be displayed on a screen and touch control information corresponding to the touch screen information; and
a controller configured to determine whether a call signal includes notification information indicating the external terminal is to touch communication terminal when the call signal is received from the external terminal, and to transmit first touch screen information and first touch control information corresponding to the first touch screen information that are stored in the database when the received call signal includes notification information notifying the external terminal is the touch communication terminal.

16. The touch screen information providing apparatus of claim 15, wherein:
the controller fetches second touch screen information corresponding to touch input information and second touch control information corresponding to the second touch screen information from the database when the touch input information corresponding to a touched area is received from the external terminal, and to transmit the fetched second touch screen information and the fetched second touch control information to the external terminal.

17. A touch information communication method of a terminal for transmitting touch information to and receiving touch information from a touch screen information providing apparatus, comprising:

transmitting notification information to the touch screen information providing apparatus by carrying the notification information on a call signal, where the notification information is for notifying that the terminal is a touch communication terminal, and performing signal conversion on the notification information by a video gateway that performs inter-heterogeneous network signal conversion;
receiving a call signal from the touch screen information providing apparatus by performing the signal conversion on the call signal including touch screen information and touch control information corresponding to the touch screen information by the video gateway; and
determining a touched area when a user touches a predetermined area on a screen, performing the signal conversion on touch input information corresponding to the touched area by the video gateway, and transmitting the touch input information to the touch screen information providing apparatus.

18. The touch information communication method of claim 17, wherein:
the transmitting the notification information includes carrying and transmitting the notification information on at least one of a H.245 VendorIdentification message and a session initiation protocol (SIP) Info message during a call after a call setup process is completed.

19. The touch information communication method of claim 17, wherein:
the transmitting the notification information includes, transmitting the notification information by carrying the notification information on at least one of a session initiation protocol (SIP) invite message and an signal system 7 (SS7) initial address message during the call setup process.

20. The touch information communication method of claim 17, wherein:
the transmitting the notification information includes, transmitting the notification information to the touch screen information providing apparatus by carrying the notification information on the response message after receiving at least one of the session initiation protocol (SIP) invite message and signal system 7 (SS7 initial address message during the call setup process.

21. The touch information communication method of claim 17, wherein:
the transmitting the touch input information includes transmitting the touch input information by one of converting the touch input information into a dual-tone multi-frequency (DTMF) signal according to the touch control information and carrying the touch input information on the session initiation protocol (SIP) Info message.

22. The touch information communication method of claim 17, wherein:
the transmitting the touch input information includes transmitting the touch input information by one of converting the touch input information into a DTMF signal value by using audio and video medium according to the touch control information and carrying the touch input information on an H.245 UserInputIndication message.

* * * * *